(12) United States Patent
Jiang

(10) Patent No.: US 11,818,583 B2
(45) Date of Patent: Nov. 14, 2023

(54) METHOD AND DEVICE FOR UNLOCKING COMMUNICATION, AND COMPUTER STORAGE MEDIUM

(71) Applicant: BEIJING XIAOMI MOBILE SOFTWARE CO., LTD., Beijing (CN)

(72) Inventor: Tian Jiang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 21 days.

(21) Appl. No.: 16/893,014

(22) Filed: Jun. 4, 2020

(65) Prior Publication Data
US 2021/0219134 A1 Jul. 15, 2021

(30) Foreign Application Priority Data
Jan. 13, 2020 (CN) .......................... 202010032391.0

(51) Int. Cl.
*H04W 12/61* (2021.01)
*H04W 76/15* (2018.01)
*H04L 9/32* (2006.01)

(52) U.S. Cl.
CPC ........... *H04W 12/61* (2021.01); *H04L 9/3271* (2013.01); *H04W 76/15* (2018.02)

(58) Field of Classification Search
CPC ....... H04W 12/06; H04W 4/023; H04W 4/40; H04W 12/062; H04W 12/08; H04W 4/80; H04W 12/041; H04W 12/068; H04W 4/44; H04W 84/005; H04W 12/04; H04W 4/021; H04W 4/12; H04W 88/02; H04W 76/15; H04L 67/10; H04L 2209/84; H04L 63/08; H04L 63/06; H04L 63/061; H04L 63/12; H04L 67/12; H04L 9/0816; H04L 9/0894; H04L 9/3247; H04L 9/3297; H04L 2209/12; H04L 9/3234; H04L 9/3271

See application file for complete search history.

(56) References Cited

U.S. PATENT DOCUMENTS

2013/0010682 A1* 1/2013 Kim ..................... H04W 72/042
370/315
2013/0271273 A1 10/2013 Oesterling
(Continued)

FOREIGN PATENT DOCUMENTS

CN 105191172 A 12/2015
CN 109584406 4/2019
(Continued)

OTHER PUBLICATIONS

Extended European Search Report dated Jul. 28, 2020 in European Patent Application No. 20182279.8, 7 pages.

*Primary Examiner* — Srilakshmi K Kumar
*Assistant Examiner* — Jing Gao
(74) *Attorney, Agent, or Firm* — Oblon, McClelland, Maier & Neustadt, L.L.P.

(57) ABSTRACT

Aspects of the disclosure provide a method and device for unlocking communications. The method can include that, after a connection is established with a second device, a preset time interval for communications in an unlocking process is determined. The method can further include that, after the preset time interval for communications is determined, unlocking communication with the second device is performed according to the preset time interval for communications.

12 Claims, 8 Drawing Sheets

After a connection is established with a second device, a preset time interval for communications in an unlocking process is determined — S21

After the preset time interval for communications is determined, unlocking communication with the second device is performed according to the preset time interval for communications — S22

(56) References Cited

U.S. PATENT DOCUMENTS

| | | | |
|---|---|---|---|
| 2018/0007078 A1* | 1/2018 | Motos | H04L 63/1441 |
| 2019/0135229 A1* | 5/2019 | Ledvina | H04L 63/18 |
| 2019/0213145 A1* | 7/2019 | Stitt | B60R 25/00 |

FOREIGN PATENT DOCUMENTS

| | | |
|---|---|---|
| CN | 110386105 A | 10/2019 |
| CN | 110519377 A | 11/2019 |
| WO | WO 2018/006096 A1 | 1/2018 |
| WO | WO 2019/110113 A1 | 6/2019 |

\* cited by examiner

METHOD AND DEVICE FOR UNLOCKING COMMUNICATION, AND COMPUTER STORAGE MEDIUM

CROSS-REFERENCE TO RELATED APPLICATIONS

This application is filed based upon and claims the priority of Chinese patent application No. 202010032391.0, filed on Jan. 13, 2020, the entire content of which is incorporated herein by reference.

BACKGROUND

In a process of near field unlocking, a trusted device and a device to be unlocked are required to establish a data transmission link for authentication. However, the trusted device may not judge whether there is a relay attacker in the link. If the link is relayed, the attacker may implement remote unlocking. In present unlocking solutions, signal strength is generally adopted as a distance judgment basis. However, a signal may be maliciously amplified, so an unlocking manner of judging a distance between devices through signal strength to further judge whether an unlocking operation is executed at a short distance has a poor relay attack prevention effect.

SUMMARY

The present disclosure generally relates to the technical field of communication, and more particularly, to a method and device for unlocking communication.

According to a first aspect of the present disclosure, there is provided a method for unlocking communication that may be applied to a first device. The method can include that, after the first device establishes a connection with a second device, the first device determines a preset time interval for communications in an unlocking process, and, after the first device determines the preset time interval for communications, the first device performs unlocking communication with the second device according to the preset time interval for communications.

According to a second aspect of the embodiments of the present disclosure, there is provided a method for unlocking communication that can be applied to a second device. The method can include that, after the second device establishes a connection with a first device, the second device determines a preset time interval for communications in an unlocking process, and, after the second device determines the preset time interval for communications, the second device performs unlocking communication the first device according to the preset time interval for communications.

According to a third aspect of the present disclosure, there is provided a device for unlocking communication, which may be applied to a first device and include a processor; and a memory configured to store an executable instruction. The processor can be configured to, after a connection is established with a second device, determine a preset time interval for communications in an unlocking process, and, after the preset time interval for communications is determined, perform unlocking communication with the second device according to the preset time interval for communications.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure. In the accompanying drawings.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the embodiments of the present application. Instead, they are merely examples of apparatuses and methods consistent with aspects related to the embodiments of the present application as recited in the appended claims.

Terms used in the embodiments of the present disclosure are only adopted for the purpose of describing specific embodiments and not intended to limit the embodiments of the present disclosure. "A/an", "said" and "the" in a singular form in the embodiments of the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that, although terms first, second, third and the like may be adopted to describe various information in the embodiments of the present disclosure, the information should not be limited to these terms. These terms are only adopted to distinguish the information of the same type. For example, without departing from the scope of the embodiments of the present disclosure, first information may also be called second information and, similarly, second information may also be called first information. For example, terms "if" and "in case" used here may be explained as "while" or "when" or "responsive to determining", which depends on the context.

Figure 1:
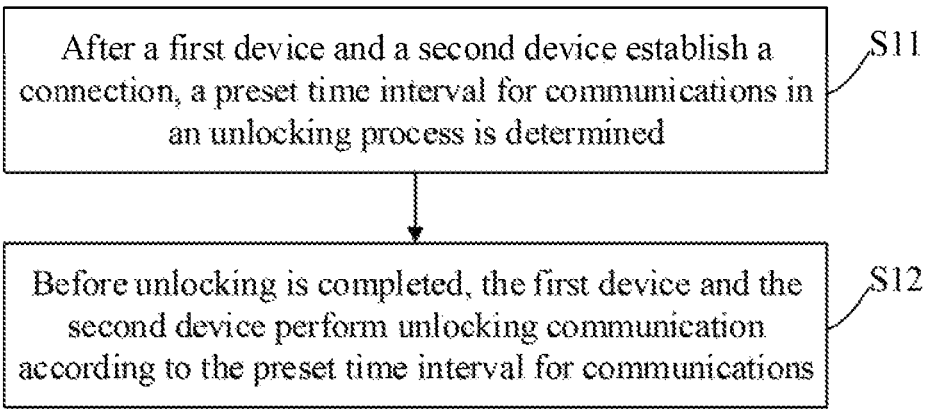
FIG. 1 is a flowchart showing a method for unlocking communication, according to an exemplary embodiment.

FIG. 1 is a flowchart showing a method for unlocking communication, according to an exemplary embodiment. As shown in FIG. 1, the method for unlocking communication is applied to a communication system. The communication system includes a first device and a second device. The first device is a device to be unlocked. The second device is an unlocking device such as a trusted device. For example, the second device includes, but not limited to, an intelligent key and an intelligent wearable device such as an intelligent band. The first device includes, but not limited to, an automobile matched with the intelligent key and a terminal matched with the intelligent wearable device, such as a mobile phone, a notebook computer, a tablet computer, an air conditioner and a television. The method for unlocking communication includes the following steps.

In S11, after the first device and the second device establish a connection, a preset time interval for communications in an unlocking process is determined.

In S12, before unlocking is completed, the first device and the second device perform unlocking communication according to the preset time interval for communications.

In the embodiment, the preset time interval for communications may be determined in a manner of negotiation by the first device and the second device. In an embodiment, after the first device and the second device establish the connection, the preset time interval for communications in the unlocking process is determined in the manner of negotiation. After the preset time interval for communications is determined by negotiation, unlocking communication may be performed according to the preset time interval for communications.

Such a manner is favorable for preventing an attacker from acquiring the time interval for communications in advance, so that the risk of a relay attack to the communication system formed by the first device and the second device is reduced.

It is to be noted that the first device and the second device may adopt different preset time intervals for communications for each unlocking process. Such a manner is favorable for preventing the attacker from calculating the time interval for communications in advance according to acquired historical data, so that the risk of the relay attack to the communication system formed by the First device and the second device is reduced.

In the embodiment, the unlocking process includes multiple communications, namely multiple communications are required to complete an unlocking operation.

In some implementation, the operation that the first device and the second device perform unlocking communication according to the preset time interval for communications includes that, in a process of each of the multiple communications, the first device and the second device perform data exchange for a single data packet. Herein, single data packet refers to that data presently to be exchanged is carried in one data packet during data exchange.

In such a manner, since the first device and the second device only perform single data packet-based communication during each communication, if the attacker does not send a single data packet to the first device or the second device, the first device or the second device may determine that there is a relay attack and rapidly cuts off the connection to prevent the relay attack.

The operation that data exchange for a single data packet includes that the first device and the second device send data packets according to a sequence. In such a manner, the first device and the second device send the data packets according to the sequence, if the attacker sends a single data packet to the first device or the second device in a wrong sending sequence, the first device or the second device may determine that there is a relay attack and rapidly cuts off the connection to prevent the relay attack and further reduce the risk of the relay attack.

In some implementations, the operation that data exchange for a single data packet includes that in a process of data exchange for the single data packet, when the first device or the second device has no data required to be sent, an empty data packet is sent.

In such a manner, since the first device or the second device, when having no data required to be sent, may send an empty data packet in the process of data exchange for the single data packet of the first device and the second device, if the attacker, when sending a data packet to the first device or the second device, does not know when to send the data packet and also does not know when to send an empty data packet, the first device or the second device, if receiving a non-empty data packet when an empty data packet should be received or receiving an empty data packet when a non-empty data packet should be received, may determine that there is a relay attack and rapidly cuts off the connection to prevent the relay attack and further reduce the risk of the relay attack.

In the solution, an unlocking authentication manner for the first device and the second device includes, but not limited to a challenge-response identity verification manner, a two-way authentication identity verification manner and an asymmetric encryption identity verification manner. It is to be noted that the authentication manners listed above are only examples and the unlocking authentication manner for the first device and the second device is not limited in the present disclosure.

According to the technical solution of the embodiment of the present disclosure, after a communication link is established between the devices, both sides are required to perform unlocking communication according to a fixed time interval; and during each communication, data exchange is allowed to be performed only once, and the data exchange process is that: the first device (i.e., the device to be unlocked) sends a data packet A to the second device (i.e., the trusted device) at first, and then the trusted device sends a data packet B to the device to be unlocked and; even though no data is required to be sent, it is required to send an empty packet. In such a manner, since a strict time sequence requirement is added into the unlocking process, whether there is a relay attack may be discriminated better, and a relay attack prevention effect may be achieved without additionally changing hardware. According to the technical solution of the present disclosure, no nanosecond high-accuracy clock is required, and only millisecond timing accuracy is required, so that hardware cost may be greatly reduced.

Descriptions are made below only with the condition that the first device and the second device adopt the challenge-response identity verification manner for unlocking as an example. Unlocking is completed in a challenge-response manner through the following steps.

In a, the trusted device sends a broadcast signal carrying a specific identifier.

In b, the device to be unlocked, after receiving the broadcast signal, initiates a connection request.

In c, the trusted device and the device to be unlocked, after being connected, determine a communication interval in an unlocking flow by negotiation.

In d, after the communication interval is determined, random number challenge may be started.

In e, the device to be unlocked sends a challenge value to the trusted device and simultaneously starts timing.

The challenge value is formed by a random number and the determined communication interval.

In f, the trusted device, after receiving the challenge value, checks the communication interval therein. If the communication interval is inconsistent with the determined communication interval, then it is determined that there is an attack, and the connection is immediately cut off, namely unlocking fails. If the communication interval is consistent the determined communication interval, then the challenge value is encrypted with a key shared by the two devices to generate a response value for returning to the device to be unlocked.

It is to be noted that how to synchronize the key is not limited in the present disclosure.

In g, the device to be unlocked, after receiving the response value, stops timing and checks the response value by using the key shared by the two devices. Responsive to checking fails, the connection is directly cut off and it is determined that unlocking fails. Responsive to checking succeeds, timing time is determined. If the timing time is less than M connection intervals, then it is determined that unlocking succeeds. If the timing time is greater than the M connection intervals, then it is determined that unlocking fails. When unlocking fails, retrying may be initiated, but the number of retries is not greater than a preset value. A value of M may be set according to a device hardware capability. That is, if the hardware capability is high, it is indicated that a processing speed is high and the value of M may be set to be relatively small. On the contrary, if the hardware capability is low, it is indicated that the processing speed is low and the value of M may be set to be relatively large.

It is to be understood that the flow shown in Steps a to g is based on the method for unlocking communication shown in FIG. 1 and Steps a to g are only schematic. There are no limits made thereto in the present application.

Embodiment 2

Figure 2:
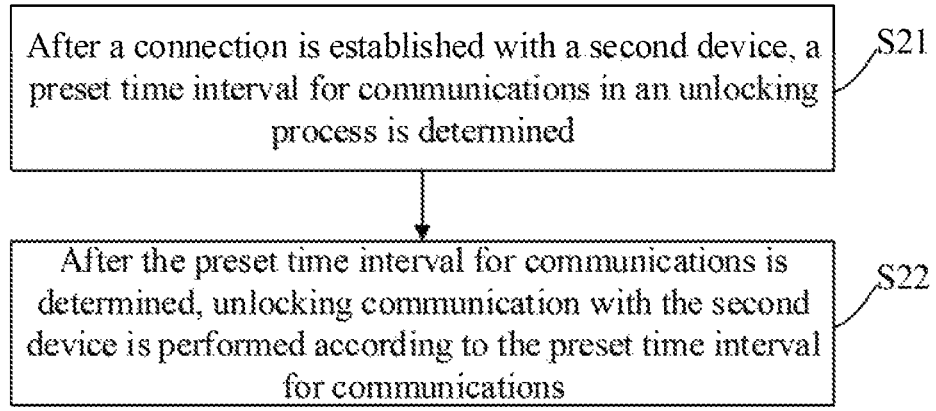
FIG. 2 is a flowchart showing another method for unlocking communication, according to an exemplary embodiment.

FIG. 2 is a flowchart showing another method for unlocking communication, according to an exemplary embodiment. As shown in FIG. 2, the method for unlocking communication is applied to a first device. The first device is a device to be unlocked. The first device includes, but not limited to, an automobile and terminal, such as a mobile phone, a notebook computer, a tablet computer, an air conditioner and a television, matched with a second device. The second device is an unlocking device. The second device includes, but not limited to, an intelligent key and an intelligent wearable device such as an intelligent band. The method for unlocking communication includes the following steps.

In S21, after a connection is established with the second device, a preset time interval for communications in an unlocking process is determined.

In S22, after the preset time interval for communications is determined, unlocking communication is performed with the second device according to the preset time interval for communications. The operation that the preset time interval for communications in the unlocking process is determined includes that the preset time interval for communications is determined in a manner of negotiation with the second device.

In the embodiment, the unlocking process includes multiple communications, namely multiple communications are required to complete an unlocking operation.

In the embodiment, the unlocking process includes multiple communications, and the operation that unlocking communication with the second device is performed according to the preset time interval for communications includes that, in a process of each of the multiple communications with the second device, data exchange for a single data packet is performed according to the preset time interval for communications.

In such a manner, since the first device only performs single data packet-based communication with the second device during each communication, if an attacker does not send a single data packet to the first device, the first device may determine that there is a relay attack and rapidly cuts off the connection to prevent the relay attack.

In the embodiment, the operation that unlocking communication with the second device is performed according to the preset time interval for communications includes that, in the process of each of the multiple communications, a single data packet is sent to the second device according to a preset sequence of the multiple communications. For example, the single data packet is sent before the second device sends a single data packet.

In such a manner, since the first device and the second device send data packets according to the sequence, if the attacker sends a single data packet to the first device in a wrong sending sequence, the first device may determine that there is a relay attack and rapidly cuts off the connection to prevent the relay attack and further reduce the risk of the relay attack.

In the embodiment, the operation that unlocking communication with the second device is performed according to the preset time interval for communications includes that, in a process of data exchange for the single data packet, responsive to that no data is required to be sent for present data exchange, an empty data packet is sent to the second device.

In such a manner, since the first device, when having no data required to be sent, may send an empty data packet in the process of data exchange for a single data packet of the first device and the second device. If the attacker, when sending a data packet to the first device, does not know when to send the data packet and also does not know when to send an empty data packet, the first device, if receiving a non-empty data packet when an empty data packet should be received or receiving an empty data packet when a non-empty data packet should be received, may determine that there is a relay attack and rapidly cuts off the connection to prevent the relay attack and further reduce the risk of the relay attack.

In some implementations, the operation that the connection is established with the second device includes that, after a broadcast message carrying a preset identifier is received from the second device, the connection is established with the second device.

The preset identifier may be an identifier which can be recognized by the first device and is used to represent the first device.

In such a manner, the first device, after receiving the broadcast message from the second device, establishes the connection with the second device.

In some implementations, the operation that unlocking communication with the second device is performed according to the preset time interval for communications includes that a challenge value is sent to the second device according to the preset time interval for communications, the challenge value including a random number and the preset time interval for communications.

In such a manner, the preset time interval previously determined by negotiation is added into the challenge value, and the attacker is unlikely to know the preset time interval, so that security of data in a transmission process is improved, and unlocking security is improved.

In some implementations, the operation that unlocking communication with the second device is performed according to the preset time interval for communications includes that a response value returned by the second device based on the challenge value is received, the response value being generated by the second device by encrypting the challenge value with a shared key, and the response value is checked by using the shared key. The operation can further include that, responsive to checking fails, it is determined that there is an attack, and the connection with the second device is cut off, and, responsive to checking succeeds, it is determined whether a time interval between initiation of the challenge value and reception of the response value is less than or equal to preset time interval for M communications, M being a preset positive integer. If the time interval between initiation of the challenge value and reception of the response value is less than or equal to preset time interval for M communications, then unlocking is allowed. If the time interval between initiation of the challenge value and reception of the response value is greater than preset time interval for M communications, then it is determined that unlocking fails.

Herein, M may be set according to a requirement such as an accuracy or time requirement. For example, it is set that M=2.

After the challenge value is sent, responsive to that at least one preset time interval for communications ends and whether unlocking is allowed has not been determined, a single empty data packet is sent to the second device.

That is, after negotiation of the preset time interval for communications is completed, unlocking communication may be performed according to the preset time interval for communications, in the unlocking process, when a preset time interval for each communication ends, a data packet may be sent, and before determining whether unlocking succeeds, if a preset time interval for present communication ends and no data packet is required to be sent or calculation of a data packet required to be sent has yet not been completed, a single empty data packet is required to be sent to the second device.

It is to be noted that how to determine the shared key is not limited and how to synchronize the shared key is also not limited in the present application. In such a manner, before the first device allows unlocking, the preset time interval for communications is determined with the second device at first, and moreover, the challenge value is sent to the second device, the challenge value including the random number and the preset time interval for communications, so that the security of the data in the transmission process is improved; and the response value of the second device is checked by using the shared key, so that the unlocking security is further improved.

In some implementations, after it is determined that unlocking fails, the method further includes that the challenge value is resent to the second device in an allowed range of the number of times for resending. The number of times for resending may be set according to a requirement such as the accuracy or time requirement. For example, the number of times for resending is set to be maximally 4.

According to the technical solution provided in the embodiment of the present disclosure, after the first device establishes the connection with the second device, the preset time interval for communications in the unlocking process is determined; and before unlocking is completed, the first device performs unlocking communication with the second device according to the preset time interval for communications. In such a manner, relay attacks may be prevented without a high-accuracy clock, and hardware cost may be reduced.

Embodiment 3

Figure 3:
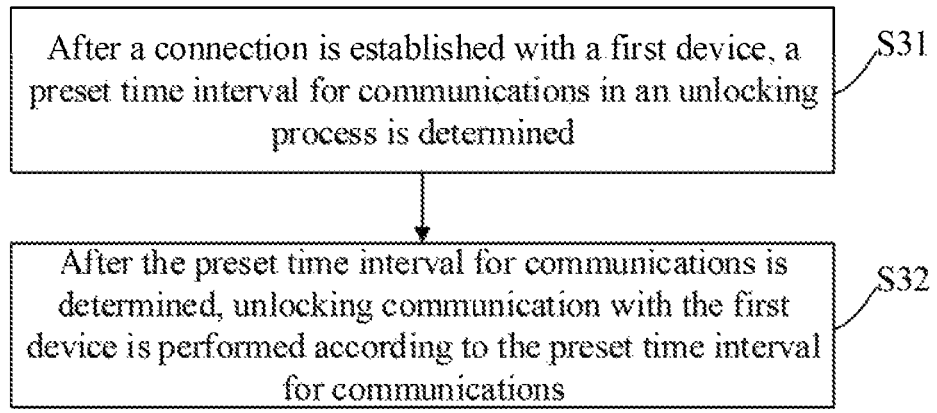
FIG. 3 is a flowchart showing another method for unlocking communication, according to an exemplary embodiment.

FIG. 3 is a flowchart showing another method for unlocking communication, according to an exemplary embodiment. As shown in FIG. 3, the method for unlocking communication is applied to a second device. The second device is an unlocking device, i.e., a trusted device, and the second device includes, but not limited to, an intelligent key and an intelligent wearable device such as an intelligent band. The method for unlocking communication includes the following steps.

In S31, after a connection is established with a first device, a preset time interval for communications in an unlocking process is determined.

In S32, after the preset time interval for communications is determined, unlocking communication with the first device is performed according to the preset time interval for communications.

The operation that the preset time interval for communications in the unlocking process is determined includes that the preset time interval for communications is determined in a manner of negotiation with the first device. That is, the preset time interval for communications is determined in the manner of negotiation after the second device establishes the connection with the first device.

In the embodiment, the first device is a device to be unlocked, and the first device includes, but not limited to, an automobile and terminal, such as a mobile phone, a notebook computer, a tablet computer, an air conditioner and a television, matched with the second device.

In the embodiment, the unlocking process includes multiple communications, namely multiple communications are required to complete an unlocking operation.

In the embodiment, the operation that unlocking communication is performed with the first device according to the preset time interval for communications includes that, in a process of each of the multiple communications with the first device, data exchange for a single data packet is performed according to the preset time interval for communications.

In such a manner, since the second device only performs single data packet-based communication with the first device for each communication, if an attacker does not send a single data packet to the second device, the second device may determine that there is a relay attack and rapidly cuts off the connection to prevent the relay attack.

In the embodiment, the operation that unlocking communication with the first device is performed according to the preset time interval for communications includes that, in the process of each of the multiple communications, a single data packet is sent to the first device according to a preset sequence of the multiple communications. For example, the single data packet is sent after the first device sends the single data packet.

In such a manner, since the first device and the second device send data packets according to the sequence, if the attacker sends a single data packet to the second device in a wrong sending sequence, the second device may determine that there is a relay attack and rapidly cuts off the connection to prevent the relay attack and further reduce the risk of the relay attack.

In the embodiment, the operation that unlocking communication with the first device is performed according to the preset time interval for communications includes that in a process of data exchange for the single data packet, responsive to that no data is required to be sent or that data required to be sent has not been prepared for present data exchange, an empty data packet is sent to the first device.

In such a manner, since the second device, when having no data required to be sent, may send an empty data packet in the process of data exchange for a single data packet of the first device and the second device, if the attacker, when sending a data packet to the second device, does not know when to send the data packet and also does not know when to send an empty data packet, the second device, if receiving a non-empty data packet when an empty data packet should be received or receiving an empty data packet when a non-empty data packet should be received, may determine that there is a relay attack and rapidly cuts off the connection to prevent the relay attack and further reduce the risk of the relay attack.

In the solution, before the connection is established with the first device, the method further includes that a broadcast message carrying a preset identifier is sent to the first device. The preset identifier may be an identifier which can be recognized by the first device and is used to represent the first device.

In such a manner, the second device sends the broadcast message to the first device in the hope of establishing the connection with the first device to further unlock the first device.

In some implementations, the operation that unlocking communication with the first device is performed according to the preset time interval for communications includes that a challenge value is received from the first device, the challenge value including a random number and the preset time interval for communications.

In such a manner, the preset time interval previously determined by negotiation is added into the challenge value, and the attacker is unlikely to know the preset time interval, so that security of data in a transmission process is improved, and unlocking security is improved.

In the solution, the operation that unlocking communication with the first device is performed according to the preset time interval for communications further includes that it is determined whether a time interval for communications carried in the challenge value is consistent with the preset time interval for communications. If the time interval for communications carried in the challenge value is consistent with the preset time interval for communications, then the challenge value is encrypted with a shared key to generate a response value, and the response value is sent to the first device according to the preset time interval for communications. If the time interval for communications carried in the challenge value is inconsistent with the preset time interval for communications, then it is determined that there is an attack, and the connection with the first device is cut off.

It is to be noted that how to determine the shared key is not limited and how to synchronize the shared key is also not limited in the present application.

In addition, before the response value is sent and after the response value is sent, responsive to that at least one preset time interval for communications ends and whether unlocking succeeds or not has yet not been determined, a single empty data packet is sent to the first device. That is, after the preset time interval for communications is determined by negotiation, the second device is required to send data packets to the first device according to the preset time interval for communications. In such case, before the response value is sent and after the response value is sent, when the preset time interval for communication ends, a single empty data packet may be sent as agreed until a result indicating whether unlocking succeeds is determined.

In such a manner, the preset time interval previously determined by negotiation is added into the challenge value, the attacker is unlikely to know the preset time interval, and whether the time interval for communications carried in the challenge value is consistent with the preset time interval for communications is determined, so that the security of the data in the transmission process is improved. The challenge value is encrypted with the shared key to generate the response value, and the response value is sent to the first device, so that the security of the data during transmission may also be improved to further improve the unlocking security and reduce the risk of the relay attack.

According to the technical solution provided in the embodiment of the present disclosure, after the first device establishes the connection with the second device, the preset time interval for communications in the unlocking process is determined; and before unlocking is completed, the first device performs unlocking communication with the second device according to the preset time interval for communications. In such a manner, relay attacks may be prevented without a high-accuracy clock, and hardware cost may be reduced.

Embodiment 4

Figure 4:
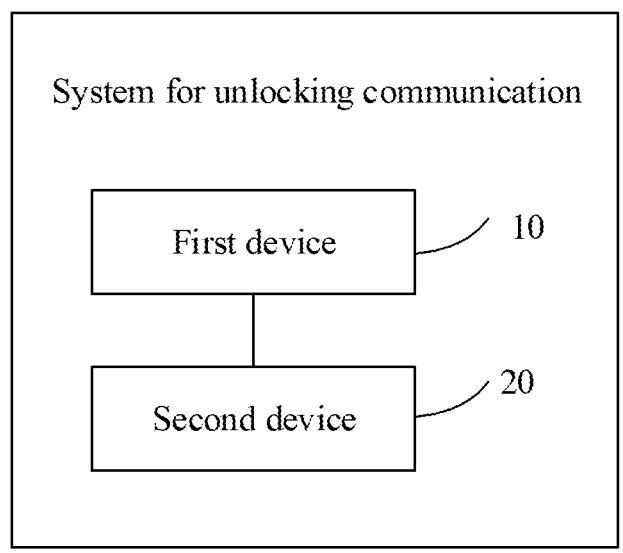
FIG. 4 is a block diagram of a system for unlocking communication, according to an exemplary embodiment.

FIG. 4 is a block diagram of a system for unlocking communication, according to an exemplary embodiment. Referring to FIG. 4, the system includes a first device 10 and a second device 20.

The first device 10 is configured to perform unlocking communication with the second device according to a preset time interval for communications.

The second device 20 is configured to perform unlocking communication with the first device according to the preset time interval for communications.

The preset time interval for communications is determined in a manner of negotiation after the first device establishes a connection with the second device.

In the solution, the first device 10 is configured to, in the process of each of the multiple communications before completion of unlocking, perform data exchange for a single data packet according to the preset time interval for communications, and the second device 20 can be configured to, in the process of each of the multiple communications before completion of unlocking, perform data exchange for a single data packet according to the preset time interval for communications.

In the solution, the first device 10 is configured to, in the process of each of the multiple communications, send a single data packet to the second device according to a preset sequence of the multiple communications. For example, the first device 10 is configured to, in the process of each of the multiple communications, send a data packet before the second device sends a data packet.

The second device 20 is configured to, in the process of each of the multiple communications, send a single data packet to the first device according to the preset sequence of the multiple communications. For example, a data packet is sent to the first device after a data packet is received from the first device. The first device is a device to be unlocked, and the second device is an unlocking device.

In the solution, the first device 10 is configured to, in a process of data exchange for a single data packet, responsive to that no data is required to be sent for present data exchange, send an empty data packet, and the second device 20 is configured to, in the process of data exchange for a single data packet, responsive to that no data is required to be sent during present data exchange, send an empty data packet.

Those skilled in the art should know that functions of the first device and second device in the system for unlocking communication of the embodiment may be understood with reference to the related descriptions of the unlocking communication method of each abovementioned embodiment.

According to the system for unlocking communication provided in the embodiment of the present application, no nanosecond high-accuracy clock but only millisecond timing accuracy is required to prevent relay attacks, so that hardware cost may be reduced.

Embodiment 5

Figure 5:
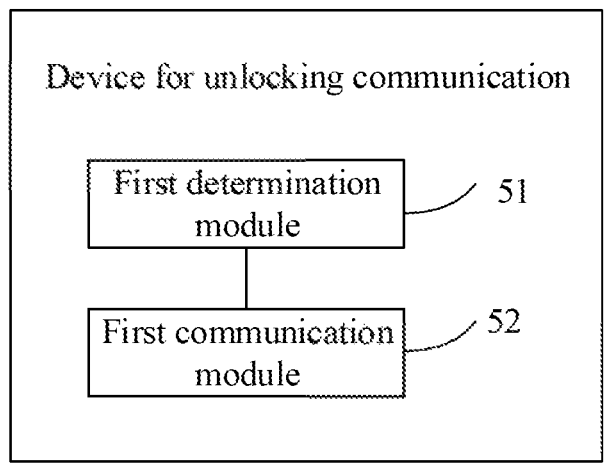
FIG. 5 is a block diagram of a device for unlocking communication, according to an exemplary embodiment.

FIG. 5 is a block diagram of a device for unlocking communication, according to an exemplary embodiment. Referring to FIG. 5, the device includes a first determination module 51 and a first communication module 52.

The first determination module 51 is configured to, after a connection is established with a second device, determine a preset time interval for communications in an unlocking process.

The first communication module 52 is configured to, after the preset time interval for communications is determined, perform unlocking communication with the second device according to the preset time interval for communications.

In the embodiment, the first determination module 51 is configured to determine the preset time interval for communications in a manner of negotiation with the second device.

In the embodiment, the unlocking process includes multiple communications, and the first communication module 52 is configured to in a process of each of the multiple communications with the second device, perform data exchange for a single data packet according to the preset time interval for communications.

In the embodiment, the first communication module 52 is configured to in the process of each of the multiple communications, send a single data packet to the second device according to a preset sequence of the multiple communications.

In the embodiment, the first communication module 52 is configured to in a process of data exchange for a single data packet, responsive to that no data is required to be sent or that data required to be sent has not been prepared for present data exchange, send an empty data packet to the second device.

In the embodiment, the first communication module 52 is configured to, after a broadcast message carrying a preset identifier is received from the second device, establish the connection with the second device.

In the embodiment, the first communication module 52 is configured to send a challenge value to the second device according to the preset time interval for communications, the challenge value including a random number and the preset time interval for communications.

In the embodiment, the first communication module 52 is configured to receive a response value returned by the second device based on the challenge value, the response value being generated by the second device by encrypting the challenge value with a shared key.

In the embodiment, the first determination module 51 is further configured to check the response value by using the shared key, and, responsive to checking fails, determine that there is an attack and notify the first communication module 52 to cut off the connection with the second device. The first determination module 51 can be further configured to, responsive to checking succeeds, determine whether a time interval between initiation of the challenge value and reception of the response value is less than or equal to M preset time intervals for communications, M being a preset positive integer, if the time interval between initiation of the challenge value and reception of the response value is less than or equal to the M preset time intervals for communications, allow unlocking and, if the time interval between initiation of the challenge value and reception of the response value is greater than the M preset time intervals for communications, determine that unlocking fails.

In the embodiment, the first communication module 52 is further configured to, after the challenge value is sent, responsive to that at least one preset time interval for communications ends and whether unlocking is allowed has yet not been determined, send a single empty data packet to the second device.

With respect to the device in the above embodiment, the manners for performing operations for individual modules therein have been described in detail in the embodiment regarding the method, which will not be elaborated herein.

During a practical application, implementation structures of the first determination module 51 and the first communication module 52 may be implemented by a Central Processing Unit (CPU), Micro Controller Unit (MCU), Digital Signal Processor (DSP) or Programmable Logic Controller (PLC), etc. in the device for unlocking communication or an electronic device that the device for unlocking communication belongs to.

The device for unlocking communication of the embodiment may be arranged in a first device, and the first device is a device to be unlocked.

Those skilled in the art should know that functions of each processing module in the unlocking communication device of the embodiment of the present disclosure may be understood with reference to the related descriptions of the unlocking communication method and each processing module in the unlocking communication device of the embodiment of the present disclosure may be implemented an analog circuit realizing the functions in the embodiment of the present disclosure and may also be implemented by running of software executing the functions in the embodiment of the present disclosure in the electronic device.

According to the device for unlocking communication of the embodiment of the present disclosure, no nanosecond high-accuracy clock but only millisecond timing accuracy is required to prevent relay attacks, so that hardware cost may be reduced.

The embodiment of the present disclosure also discloses a device for unlocking communication, which includes a memory, a processor and a computer program stored in the memory and capable of running in the processor, the processor executing the program to implement the method for unlocking communication provided in any abovementioned technical solution applied to a first device.

As an implementation, the processor executes the program to implement the following operations that, after a connection is established with a second device, a preset time interval for communications in an unlocking process is determined, and, after the preset time interval for communications is determined, unlocking communication with the second device is performed according to the preset time interval for communications.

As an implementation, the processor executes the program to implement the following operation that the preset time interval for communications is determined in a manner of negotiation with the second device.

As an implementation, the processor executes the program to implement the following operation: the unlocking process including multiple communications, in a process of each of the multiple communications with the second device, data exchange for a single data packet is performed according to the preset time interval for communications.

As an implementation, the processor executes the program to implement the following operation: in the process of each of the multiple communications, a single data packet is sent to the second device according to a preset sequence of the multiple communications.

As an implementation, the processor executes the program to implement the following operation that in a process for data exchange for a single data packet, responsive to that no data is required to be sent or that data required to be sent has not been prepared for present data exchange, an empty data packet is sent to the second device.

As an implementation, the processor executes the program to implement the following operation: after a broadcast message carrying a preset identifier is received from the second device, the connection is established with the second device.

As an implementation, the processor executes the program to implement the following operation that a challenge value is sent to the second device according to the preset time interval for communications, the challenge value including a random number and the preset time interval for communications.

As an implementation, the processor executes the program to implement the following operation: a response value returned by the second device based on the challenge value is received, the response value being generated by the second device by encrypting the challenge value with a shared key.

As an implementation, the processor executes the program to implement the following operations that the response value is checked by using the shared key. Further, responsive to checking fails, it is determined that there is an attack, and the connection with the second device is cut off, and, responsive to checking succeeds, it is determined whether a time interval between initiation of the challenge value and reception of the response value is less than or equal to M preset time intervals for communications, M being a preset positive integer. If the time interval between initiation of the challenge value and reception of the response value is less than or equal to the M preset time intervals for communications, unlocking is allowed. If the time interval between initiation of the challenge value and reception of the response value is greater than the M preset time intervals for communications, it is determined that unlocking fails.

As an implementation, the processor executes the program to implement the following operation: after the challenge value is sent, responsive to that at least one preset time interval for communications ends and whether unlocking is allowed has yet not been determined, a single empty data packet is sent to the second device.

According to the device for unlocking communication provided in the embodiment of the present application, no nanosecond high-accuracy clock but only millisecond timing accuracy is required to prevent relay attacks, so that hardware cost may be reduced.

The embodiment of the present application also discloses a computer storage medium, in which a computer-executable instruction is stored, the computer-executable instruction being configured to execute the unlocking communication method of each abovementioned embodiment. That is, the computer-executable instruction may be executed by a processor to implement the unlocking communication method provided in any technical solution applied to a first device.

Those skilled in the art should know that functions of each program in the computer storage medium of the embodiment may be understood with reference to the related descriptions of the unlocking communication method applied to the first device.

Embodiment 6

Figure 6:
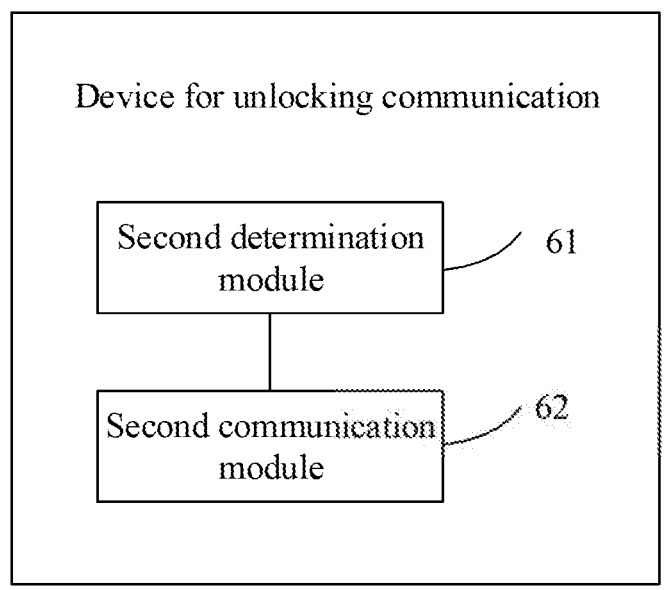
FIG. 6 is a block diagram of another device for unlocking communication, according to an exemplary embodiment.

FIG. 6 is a block diagram of another device for unlocking communication, according to an exemplary embodiment. Referring to FIG. 6, the device includes a second determination module 61 and a second communication module 62.

The second determination module 61 is configured to, after a connection is established with a first device, determine a preset time interval for communications in an unlocking process.

The second communication module 62 is configured to, after the preset time interval for communications is determined, perform unlocking communication with the first device according to the preset time interval for communications.

In the embodiment, the second determination module 61 can be configured to determine the preset time interval for communications in a manner of negotiation with the first device.

In the embodiment, the unlocking process includes multiple communications, and the second communication module 62 is configured to, in a process of each of the multiple communications with the first device, perform data exchange for a single data packet according to the preset time interval for communications.

In the embodiment, the second communication module 62 is configured to, in the process of each of the multiple communications, send a single data packet to the first device according to a preset sequence of the multiple communications.

In the embodiment, the second communication module 62 is configured to, in a process of data exchange for a single data packet, responsive to that no data is required to be sent or that data required to be sent has not been prepared for present data exchange, send an empty data packet to the first device.

In the embodiment, the second communication module 62 is configured to send a broadcast message carrying a preset identifier to the first device.

In the embodiment, the second communication module 62 is configured to receive a challenge value from the first device, the challenge value including a random number and the preset time interval for communications.

In the embodiment, the first determination module 61 is configured to determine whether a time interval for communications carried in the challenge value is consistent with the preset time interval for communications and, if the time interval for communications carried in the challenge value is inconsistent with the preset time interval for communications, determine that there is an attack.

In the embodiment, the second communication module 62 is configured to, when the second determination module 61 determines that the time interval for communications carried in the challenge value is consistent with the preset time interval for communications, generate a response value by encrypting the challenge value with a shared key and send the response value to the first device, and when the second determination module 61 determines that the time interval for communications carried in the challenge value is inconsistent with the preset time interval for communications, cut off the connection with the first device.

In the embodiment, the second communication module 62 is configured to, before the response value is sent and after the response value is sent, responsive to that at least one preset time interval for communications ends and whether unlocking succeeds has yet not been determined, send a single empty data packet to the first device.

With respect to the device in the above embodiment, the manners for performing operations for individual modules therein have been described in detail in the embodiment regarding the method, which will not be elaborated herein.

During a practical application, implementation structures of the second determination module 61 and the second communication module 62 may be implemented by a CPU, MCU, DSP or PLC, etc. in the device for unlocking communication or a second device that the device for unlocking communication belongs to.

The device for unlocking communication of the embodiment may be arranged in the second device, and the second device is an unlocking device.

Those skilled in the art should know that functions of each processing module in the unlocking communication device of the embodiment of the present disclosure may be understood with reference to the related descriptions of the unlocking communication method and each processing module in the unlocking communication device of the embodiment of the present disclosure may be implemented an analog circuit realizing the functions in the embodiment of the present disclosure and may also be implemented by running of software executing the functions in the embodiment of the present disclosure in the electronic device.

According to the unlocking communication device of the embodiment of the present disclosure, relay attacks may be prevented without any nanosecond high-accuracy clock, so that hardware cost may be reduced.

The embodiment of the present disclosure also discloses a device for unlocking communication, which includes a memory, a processor and a computer program stored in the memory and capable of running in the processor, the processor executing the program to implement the unlocking communication method provided in any abovementioned technical solution applied to a second device.

As an implementation, the processor executes the program to implement the following operations that, after a connection is established with a first device, a preset time interval for communications in an unlocking process is determined, and that after the preset time interval for communications is determined, unlocking communication with the first device is performed according to the preset time interval for communications.

As an implementation, the processor executes the program to implement the following operation that the preset time interval for communications is determined in a manner of negotiation with the first device.

As an implementation, the processor executes the program to implement the following operation: the unlocking process including multiple communications, in a process of each of the multiple communications with the first device, data exchange for a single data packet is performed according to the preset time interval for communications.

As an implementation, the processor executes the program to implement the following operation that, in the process of each of the multiple communications, a single data packet is sent to the first device according to a preset sequence of the multiple communications.

As an implementation, the processor executes the program to implement the following operation that, in a process of data exchange for a single data packet, responsive to that no data is required to be sent or that data required to be sent has not been prepared for present data exchange, an empty data packet is sent to the first device.

As an implementation, the processor executes the program to implement the following operation that a broadcast message carrying a preset identifier is sent to the first device.

As an implementation, the processor executes the program to implement the following operation that a challenge value is received from the first device, the challenge value including a random number and the preset time interval for communications.

As an implementation, the processor executes the program to implement the following operations that it is determined whether the time interval for communications carried in the challenge value is consistent with the preset time interval for communications, and, if the time interval for communications carried in the challenge value is consistent with the preset time interval for communications, then the challenge value is encrypted with a shared key to generate a response value, and the response value is sent to the first device according to the preset time interval for communications.

As an implementation, the processor executes the program to implement the following operation that, if the time interval for communications carried in the challenge value is inconsistent with the preset time interval for communications, then it is determined that there is an attack, and the connection with the first device is cut off.

As an implementation, the processor executes the program to implement the following operation that, before the response value is sent and after the response value is sent, responsive to that at least one preset time interval for communications ends and whether unlocking succeeds has yet not been determined, a single empty data packet is sent to the first device.

According to the device for unlocking communication provided in the embodiment of the present application, relay attacks may be prevented without any nanosecond high-accuracy clock, so that hardware cost may be reduced.

The embodiment of the present application also records a computer storage medium, in which a computer-executable instruction is stored, the computer-executable instruction being configured to execute the unlocking communication method of each abovementioned embodiment. That is, the computer-executable instruction may be executed by a processor to implement the unlocking communication method provided in any technical solution applied to a second device.

Those skilled in the art should know that functions of each program in the computer storage medium of the embodiment may be understood with reference to the related descriptions of the unlocking communication method applied to the second device.

Embodiment 7

Figure 7:
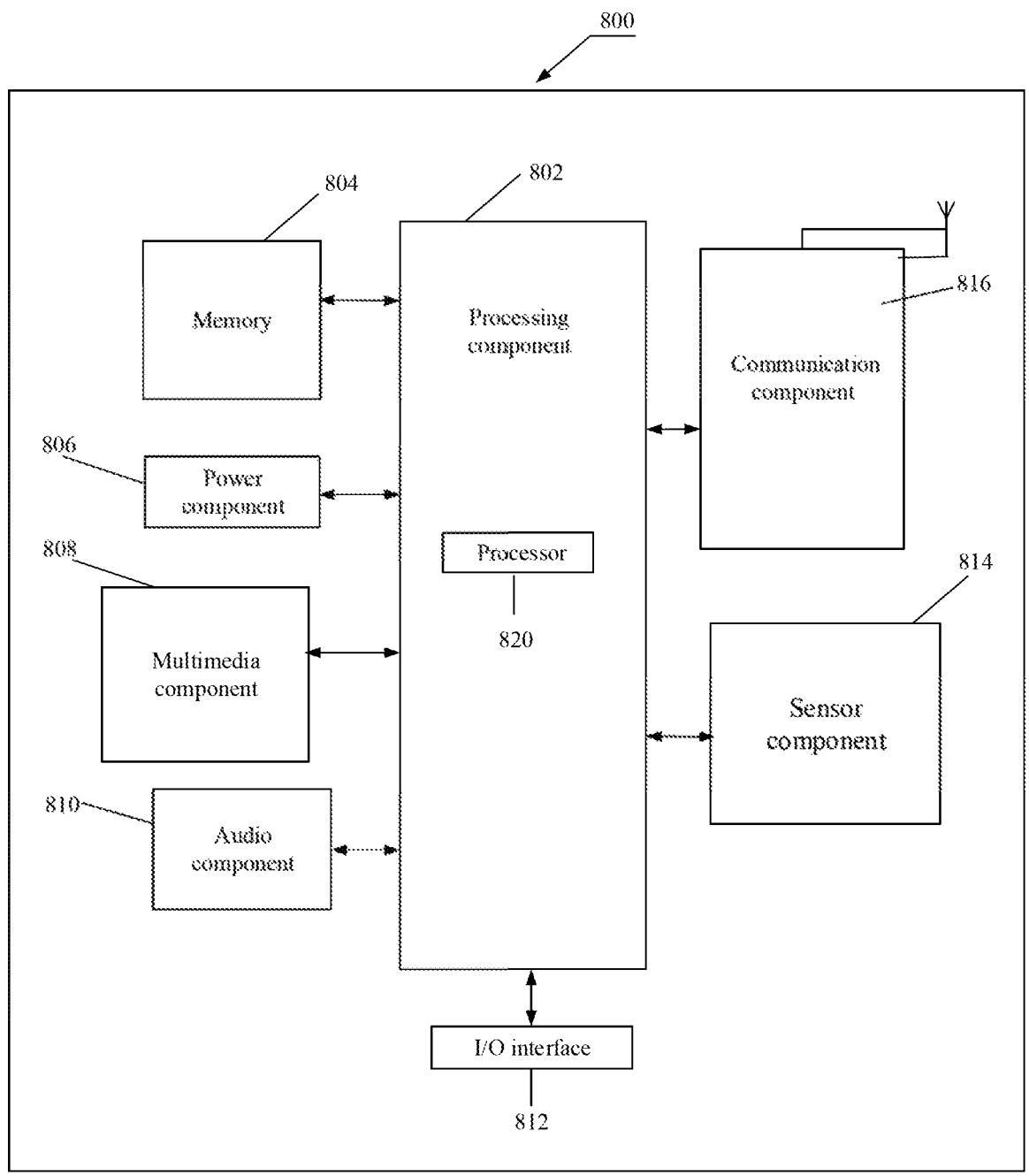
FIG. 7 is a block diagram of a device 800 implementing unlocking communication processing, according to an exemplary embodiment.

FIG. 7 is a block diagram of a device 800 for implementing unlocking communication processing, according to an exemplary embodiment. For example, the device 800 may be a mobile phone, a computer, a digital broadcast terminal, a messaging device, a gaming console, a tablet, a medical device, exercise equipment, a personal digital assistant and the like.

Referring to FIG. 7, the device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the abovementioned method. Moreover, the processing component 802 may include one or more modules which facilitate interaction between the processing component 802 and other components. For instance, the processing component 802 may include a multimedia module to facilitate interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the device 800. The power component 806 may include a power management system, one or more power supplies, and other components associated with generation, management and distribution of power for the device 800.

The multimedia component 808 includes a screen providing an output interface between the device 800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the device 800 is in the operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and a peripheral interface module, and the peripheral interface module may be a keyboard, a click wheel, a button and the like. The button may include, but not limited to: a home button, a volume button, a starting button and a locking button.

The sensor component 814 includes one or more sensors configured to provide status assessment in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the device 800 and another device. The device 800 may access a communication-standard-based wireless network, such as a Wireless Fidelity (WiFi) network, a 2nd-Generation (2G) or 3rd-Generation (3G) network or a combination thereof. In an exemplary embodiment, the communication component 816 receives a broadcast signal or broadcast associated information from an external broadcast management system through a broadcast channel. In an exemplary embodiment, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra Wide Band (UWB) technology, a Blue Tooth (BT) technology and another technology.

In an exemplary embodiment, the device 800 may be implemented by one or more Application Specific Integrated Circuits (ASICs), DSPs, Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer storage medium including an executable instruction, such as the memory 804 including an executable instruction, and the executable instruction may be executed by the processor 820 of the device 800 to implement the abovementioned method. For example, the non-transitory computer storage medium may be a ROM, a Random Access Memory (RAM), a Compact Disc Read-Only Memory (CD-ROM), a magnetic tape, a floppy disc, an optical data storage device and the like.

Figure 8:
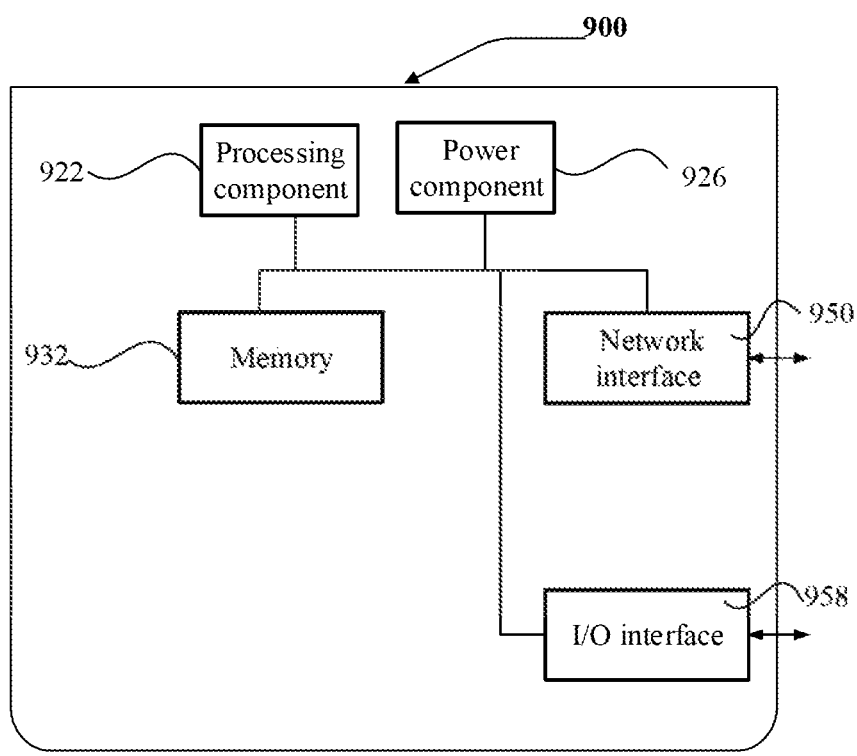
FIG. 8 is a block diagram of a device 900 implementing unlocking communication processing, according to an exemplary embodiment.

FIG. 8 is a block diagram of a device 900 for implementing unlocking communication processing, according to an exemplary embodiment. For example, the device 900 may be provided as a server. Referring to FIG. 8, the device 900 includes a processing component 922, further including one or more processors, and a memory resource represented by a memory 932, configured to store an instruction executable for the processing component 922, for example, an application program. The application program stored in the memory 932 may include one or more than one module of which each corresponds to a set of instructions. In addition, the processing component 922 is configured to execute the instruction to execute the abovementioned unlocking communication method.

The device 900 may further include a power component 926 configured to execute power management of the device 900, a wired or wireless network interface 950 configured to connect the device 900 to a network and an I/O interface 958. The device 900 may be operated based on an operating system stored in the memory 932, for example, Windows Server™, Max OS X™, Unix™, Linux™, FreeBSD™ or the like.

The technical solutions recorded in the embodiments of the present disclosure may be freely combined without conflicts.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for unlocking communication that is applied to a first device, the method comprising:
determining, by the first device, a preset time interval for communications in an unlocking process after the first device establishes a connection with a second device; and
performing, by the first device, unlocking communication with the second device according to the preset time interval for communications after the first device determines the preset time interval for the communications;
wherein performing, by the first device, unlocking communication with the second device according to the preset time interval for communications further comprises:
sending a challenge value to the second device according to the preset time interval for communications, the challenge value including a random number and the preset time interval for communications;
receiving a response value returned by the second device which is based on the challenge value, the response value being generated by the second device by encrypting the challenge value with a shared key;
checking the response value by using the shared key;
responsive to the checking fails, determining that there is an attack, and cutting off the connection with the second device; and
responsive to the checking succeed, determining whether a time interval between initiation of the challenge value and reception of the response value is less than or equal to M preset time intervals for communications, where M is a preset positive integer,
responsive to that the time interval between initiation of the challenge value and reception of the response value is less than or equal to the M preset time intervals for communications, allowing unlocking, and
responsive to that the time interval between initiation of the challenge value and reception of the response value is greater than the M preset time intervals for communications, determining that unlocking fails.

2. The method of claim 1, wherein determining, by the first device, the preset time interval for the communications in the unlocking process further comprises:
determining the preset time interval for communications in a manner of negotiation with the second device.

3. The method of claim 1, wherein establishing, by the first device, the connection with the second device further comprises:
establishing the connection with the second device after receiving a broadcast message carrying a preset identifier from the second device.

4. The method of claim 1, further comprising:
sending a single empty data packet to the second device after sending the challenge value, when at least one preset time interval for communications ends and whether unlocking is allowed has not been determined.

5. A non-transitory computer storage medium having stored therein executable instructions that, when executed by a processor of a first device, perform the method for unlocking communication of claim 1.

6. A method for unlocking communication that is applied to a second device, the method comprising:
determining, by the second device, a preset time interval for communications in an unlocking process after establishing a connection with a first device; and
performing, by the second device, unlocking communication with the first device according to the preset time interval for communications after the second device determines the preset time interval for communications;
wherein performing, by the second device, unlocking communication with the first device according to the preset time interval for communications further comprises:
receiving a challenge value from the first device, the challenge value including a random number and the preset time interval for communications;
determining whether a time interval for communications carried in the challenge value is consistent with the preset time interval for communications;
responsive to determining that the time interval for communications carried in the challenge value is consistent with the preset time interval for communications, generating a response value by encrypting the challenge value with a shared key, and sending the response value to the first device according to the preset time interval for communications; and
responsive to determining that the time interval for communications carried in the challenge value is inconsistent with the preset time interval for communications, determining that there is an attack, and cutting off the connection with the first device.

7. The method of claim 6, wherein determining, by the second device, the preset time interval for communications in the unlocking process further comprises:
determining the preset time interval for communications in a manner of negotiation with the first device.

8. The method of claim 6, before establishing, by the second device, the connection with the first device, further comprising:
sending a broadcast message carrying a preset identifier to the first device.

9. The method of claim 6, further comprising:
sending, by the second device, a single empty data packet to the first device before sending a response value and after sending the response value, when at least one preset time interval for communications ends and whether unlocking success has not been determined.

10. A non-transitory computer storage medium having stored therein executable instructions that, when executed by a processor of a second device, perform the method for unlocking communication of claim 6.

11. A device for unlocking communication that is applied to a first device, the device comprising:
a processor; and
a memory that is configured to store an executable instruction,
wherein the processor is configured to:
determine a preset time interval for communications in an unlocking process after a connection is established with a second device; and
perform unlocking communication with the second device according to the preset time interval for communications after the preset time interval for communications is determined;
wherein the processor is further configured to:
send a challenge value to the second device according to the preset time interval for communications, the challenge value including a random number and the preset time interval for communications;
receive a response value returned by the second device which is based on the challenge value, the response value being generated by the second device by encrypting the challenge value with a shared key;
check the response value by using the shared key;
responsive to the checking fails, determine that there is an attack, and cut off the connection with the second device; and
responsive to the checking succeed, determine whether a time interval between initiation of the challenge value and reception of the response value is less than or equal to M preset time intervals for communications, where M is a preset positive integer,
responsive to that the time interval between initiation of the challenge value and reception of the response value is less than or equal to the M preset time intervals for communications, allow unlocking, and
responsive to that the time interval between initiation of the challenge value and reception of the response value is greater than the M preset time intervals for communications, determine that unlocking fails.

12. The device of claim 11, wherein the processor is further configured to:
determine the preset time interval for communications in a manner of negotiation with the second device.

\* \* \* \* \*